United States Patent
Baileys et al.

(10) Patent No.: US 10,308,324 B2
(45) Date of Patent: Jun. 4, 2019

(54) PORCH MOUNTED VARIABLE RELUCTANCE MEASUREMENT TECHNOLOGY TENDON TENSION MONITORING SYSTEM

(71) Applicant: OIL STATES INDUSTRIES, INC., Arlington, TX (US)

(72) Inventors: John Ray Baileys, Arlington, TX (US); Michael Eugene Hogan, Arlington, TX (US); Joseph Michael O'Neil, Irving, TX (US); Daniel Joseph Tye, Dallas, TX (US)

(73) Assignee: Oil States Industries, Inc., Arlington, TX (US)

( * ) Notice: Subject to any disclaimer, the term of this patent is extended or adjusted under 35 U.S.C. 154(b) by 0 days.

(21) Appl. No.: 15/839,436

(22) Filed: Dec. 12, 2017

(65) Prior Publication Data

US 2018/0162491 A1    Jun. 14, 2018

Related U.S. Application Data

(60) Provisional application No. 62/433,494, filed on Dec. 13, 2016.

(51) Int. Cl.
  *B63B 21/50* (2006.01)
  *E21B 17/01* (2006.01)
  (Continued)

(52) U.S. Cl.
  CPC ........ *B63B 21/502* (2013.01); *B63B 35/4413* (2013.01); *E21B 17/01* (2013.01);
  (Continued)

(58) Field of Classification Search
  CPC ...... E21B 17/01; E21B 17/017; E21B 19/004; E21B 19/006; B63B 21/502
  (Continued)

(56) References Cited

U.S. PATENT DOCUMENTS 5,359,902 A * 11/1994 Barger ............... G01L 1/14
                                                              73/779
6,190,091 B1    2/2001 Byle
(Continued)

FOREIGN PATENT DOCUMENTS

GB    2541722    3/2017
GB    2547493    8/2017
(Continued)

OTHER PUBLICATIONS

Patent Cooperation Treaty, PCT/US2017/066858, (Filed Dec. 12, 2017) International Search Report and Written Opinion, dated Feb. 12, 2018.

*Primary Examiner* — Frederick L Lagman
(74) *Attorney, Agent, or Firm* — Morgan, Lewis & Bockius LLP

(57) ABSTRACT

The invention relates to floating platform mooring and involves an improved platform mounted tendon tension monitoring system with porch-mounted variable reluctance measurement technology sensors configured. The variable reluctance measurement technology sensors of this system are optimized for porch mounting. The porch-mounted tendon tension monitoring system can also be configured such that the porch-mounted optimized variable reluctance measurement technology sensors are replaceable. Sensors may be replaced to extend the desired useful lifetime of a tendon tension monitoring system or in the event that a sensor happens to malfunction. A plurality of variable reluctance measurement technology sensors can be configured in sensor packs at the corners or at other locations where tendon tension monitoring can be useful for a floating platform.

16 Claims, 8 Drawing Sheets

(51) Int. Cl.
*E21B 47/00* (2012.01)
*B63B 35/44* (2006.01)
*E21B 47/12* (2012.01)
*E21B 47/06* (2012.01)
*E21B 19/00* (2006.01)
*G01L 1/20* (2006.01)
*G01L 1/26* (2006.01)
*G01L 5/00* (2006.01)
*B63B 21/00* (2006.01)

(52) U.S. Cl.
CPC ........ *E21B 19/004* (2013.01); *E21B 47/0001* (2013.01); *E21B 47/0006* (2013.01); *E21B 47/065* (2013.01); *E21B 47/122* (2013.01); *G01L 1/20* (2013.01); *G01L 1/26* (2013.01); *G01L 5/0038* (2013.01); *B63B 2021/008* (2013.01); *B63B 2021/505* (2013.01)

(58) Field of Classification Search
USPC .................. 405/223.1, 224, 224.2, 224.4
See application file for complete search history.

(56) References Cited

U.S. PATENT DOCUMENTS

| | | |
|---|---|---|
| 6,422,089 B1 | 7/2002 | Madden et al. |
| 6,591,688 B2 * | 7/2003 | Wright .................... G01F 23/18 73/715 |
| 6,748,809 B2 * | 6/2004 | Hanna .................... E21B 19/09 73/779 |
| 6,752,039 B2 | 6/2004 | Kreuzer et al. |
| 6,880,408 B1 | 4/2005 | Madden et al. |
| 7,063,485 B2 * | 6/2006 | Jordan ................ E21B 19/004 405/169 |
| 7,493,827 B2 * | 2/2009 | Madden .................. G01G 3/12 73/779 |
| 9,638,654 B2 | 5/2017 | Baileys |
| 2002/0160667 A1 | 10/2002 | Madden et al. |
| 2004/0035215 A1 * | 2/2004 | Hanna .................... E21B 19/09 73/794 |
| 2005/0028606 A1 | 2/2005 | Madden et al. |
| 2005/0028607 A1 * | 2/2005 | Hanna .................... E21B 19/09 73/794 |
| 2006/0021445 A1 | 2/2006 | Hanna et al. |
| 2006/0177276 A1 * | 8/2006 | Stassen ................. E21B 17/012 405/224.3 |

FOREIGN PATENT DOCUMENTS

| | | | |
|---|---|---|---|
| KR | 2016112502 | * | 9/2016 |
| KR | 2016113757 | * | 10/2016 |
| WO | 2003091680 | | 11/2003 |
| WO | 2003099424 | | 12/2003 |
| WO | 2017141056 | | 8/2017 |

* cited by examiner

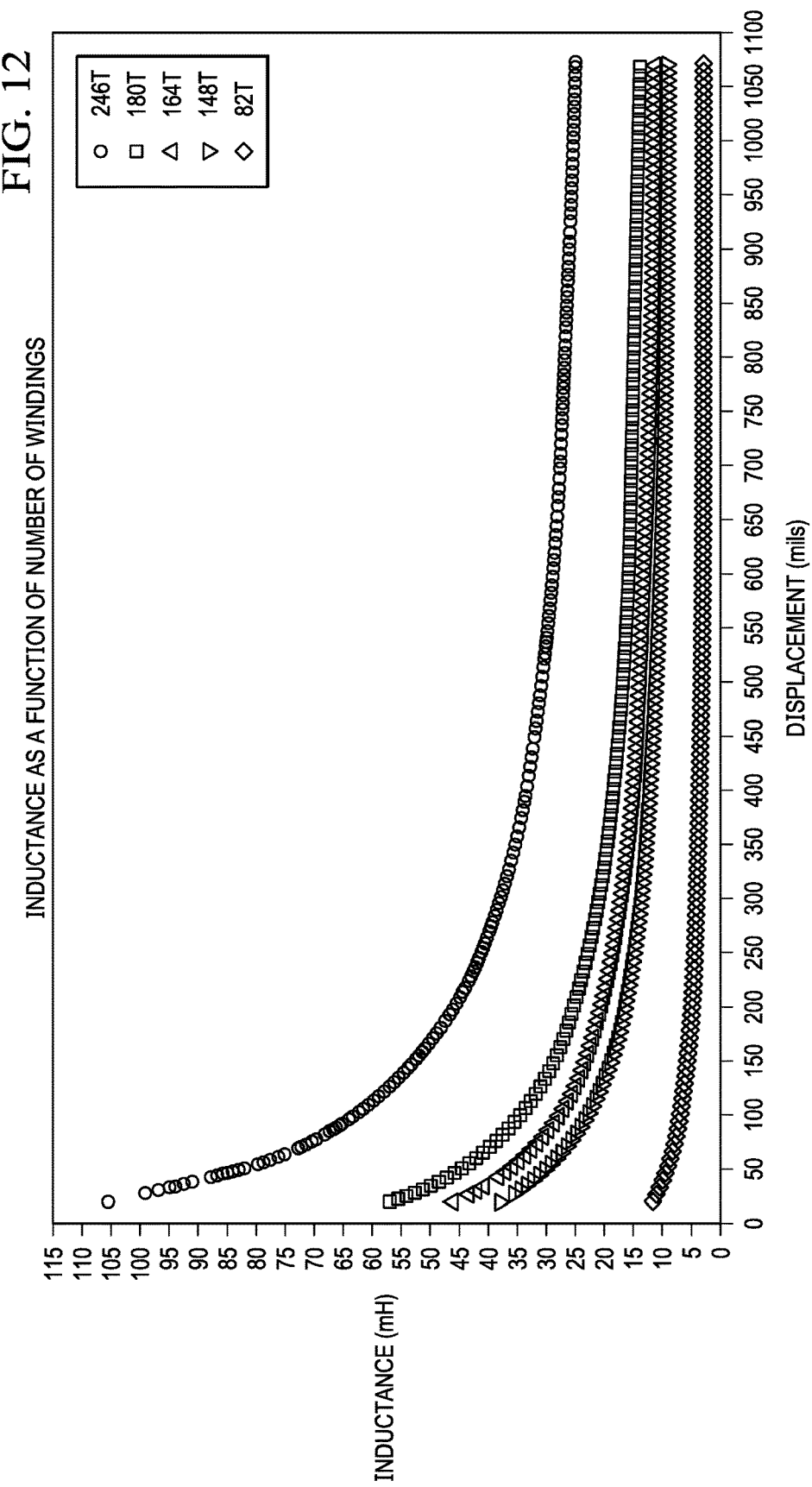

PORCH MOUNTED VARIABLE RELUCTANCE MEASUREMENT TECHNOLOGY TENDON TENSION MONITORING SYSTEM

FIELD OF THE INVENTION

The invention relates to floating platform porch-mounted tendon tension monitoring systems.

BACKGROUND

Tension Leg Platforms or "TLPs" have been used for some time in the offshore production of oil and gas. Often a tension leg platform will be moored by groupings of tendons at each corner of a platform. The lifetime of a given platform may be anywhere from 20-50+ years and thus it has become necessary to put systems in place to monitor the tendon tensions of platforms to ensure a platform can continue reliable and safe operations. Over time, a few different configurations of tendon tension monitoring have become the solution of choice for offshore TLPs. Each configuration involves the use of load measurement units and sensors. One configuration uses in-line sensors while the other configuration uses porch-mounted sensors. The in-line system type is often installed as part of the tendon string, whereas the porch-mounted system type is not part of the tendon but instead pre-installed as part of the tendon top connection apparatus. An in-line tendon tension monitoring system ("TTMS") will often be configured to employ load measurement units consisting of relatively long sections of tendon pipe or forged tubing, and are connected in-line near the top of the tendon body. In a known configuration of an in-line system variable reluctance measurement technology ("VRMT") sensors can be configured and mounted on the facing flanges that are attached to the outside of the load measurement section of the in-line system.

In contrast to an in-line system, a porch-mounted tendon tension monitoring system ("TTMS") is often configured with three or more compression type load cells that are arranged about the opening in the tendon top connector assembly ("TCA") and between bearing plates positioned either above or below a top connector flex element.

Over time it has become apparent that the variable reluctance measurement technology sensors configured on in-line tendon tension monitoring systems are significantly more reliable than the load cell sensors that are often configured in porch-mounted tendon tension monitoring systems. The initial cost of an in-line system far surpasses the initial cost of a porch-mounted system. However, conventional porch-mounted systems do not provide service life beyond five to ten years, and there are significant additional costs to servicing conventional porch-mounted systems as tension must be removed from the tendon being serviced. It would thus be desirable to configure the more reliable variable reluctance measurement technology sensor in a porch-mounted system. One problem with such a setup is that conventional variable reluctance measurement technology sensors have insufficient displacement sensitivity to be used as part of a porch-mounted system. There are also space considerations because of the limited space available between the tendon porch and the tendon top connector assembly. Conventional variable reluctance measurement technology sensors also do not fit the space profile a typical porch-mounted system would require.

Regarding variable reluctance measurement technology sensors, several prior art documents disclosed in-line VRMT sensor designs, these include U.S. Pat. Nos. 7,493,827, 6,752,039, and 6,422,089; and U.S. patent application Ser. No. 10/848,525. Mechanical amplifier systems and methods were further disclosed in several prior art documents, including U.S. Pat. No. 6,880,408, U.S. Pat. Appl. Ser. No. 60/375,789, and PCT App. No. PCT/US03/12869. Load monitoring systems and methods have also been disclosed in prior art documents, including U.S. Pat. No. 6,748,809, U.S. patent application Ser. Nos. 10/848,600 and 11/152,303, and PCT App. No. PCT/US03/15974.

Regarding VRMT sensor designs, prior art U.S. Pat. No. 7,493,827, which is incorporated herein by reference in its entirety, describes a VRMT sensor as a sensor that uses opposing magnetic cores contained in a support tube. Each of the magnetic cores is attached to opposing ends of the support tube. Thus, as the support tube expands along the tube axis, the ends of the support tube, which are perpendicular to the tube axis, separate. A magnetic circuit is formed having an inductance defined by the size of the gap between the magnetic cores. Accordingly, when the magnetic cores attached to the tube ends separate, the size of the gap between the magnetic cores is increased. Thus, when the inductance is altered, the amount of expansion that has occurred can be determined. Knowing the elastic characteristics of the support tube material, the amount of force applied to the support tube can be calculated. Similarly, contraction of the support tube results in a change in inductance that is indicative of the amount of stress reduction. Alternatively, the support tube can have very little stiffness relative to the structure that it is mounted on so that no load passes through the support tube and it merely displaces the same amount as the structure displaces in the region between the attachment points. The combination is tested under known loads to provide the calibration.

U.S. Pat. No. 7,493,827 goes on to state that one of the magnetic cores is generally preferred to be configured in a C-shape, and attached to an end plate by way of a bracket. The end plate may be one of the tube ends, or another plate that is in turn attached to the support tube. The C-shape is preferred for one of the magnetic cores so that the windings can be placed at the ends of the C-shaped cores. The other magnetic core is preferably I-shaped, and is attached to a second end plate by way of a second bracket. The second end plate, like the first end plate, may be the other tube end, or another plate that is in turn attached to the support tube. Thus, a cavity within the support tube containing the sensor is formed. Preferably, the cavity containing the sensor is sealed in a manner to prevent water or other damaging agents from entering the cavity and damaging the sensor or its wiring. The cavity can also be filled with a low durometer elastomeric potting material, silicon oil, or any other suitable material for protection of the components from environmental agents such as water. The choice of the elastomeric potting material can be selected according to the anticipated environmental exposure of the sensor. For example, in certain applications, a low out-gassing material may be appropriate if the sensor is used at high altitude or space while a low compression material may be better if the sensor is used below sea level, such as underwater or underground.

Continuing its description of VRMT sensors, U.S. Pat. No. 7,493,827, further describes that an excitation coil is wound around the poles on one of the magnetic cores, and provides electrical connection for an inductance whose value is variable as a function of the widths of the gaps, and also the axial distortion of the support tube. In the preferred embodiment, there are two excitation coils, each surrounding a separate end of the C-shaped core. This arrangement minimizes non-linearity of response due to fringing effects. The wires from the two coils are twisted and attached to cabling that connects them to external circuitry. Thus, when excited by an external AC voltage, the C-core, the I-core and the gap between the C and I cores form an element of a magnetic circuit. The reluctance of this element is dominated by the gap because the C and I cores are fabricated from high permeability magnetic materials having very little reluctance. The sensor inductance is coupled with a fixed, predetermined capacitance in a resonant inductance-capacitance (LC) circuit. The resonant frequency of the LC circuit is a function of the gap between the C-shaped and I-shaped cores. Accordingly, changes in the gap dimension results in a change in oscillation frequency. Since the only changeable component in the sensor is the number of excitation coils, the sensor is immune to drift.

Finally, as describing VRMT sensor use in an in-line sensor configuration, U.S. Pat. No. 7,493,827 states that, to measure the load on a static device, for example, a chain that moors a marine platform, the support tube is fixedly attached to the surface of a sensor link, and the sensor link placed as a link in the chain. The support tube can be attached to the surface of the sensor link using bolts, by welding, or any other suitable attaching means. In order for the sensor to measure the load on the sensor link, it is preferred that the sensor tube material and the sensor link material are compatible, more preferably the same material or material having the same or similar coefficient of thermal expansion. In the preferred embodiment, the support tube and the sensor link are made of steel. When used in marine applications, it is preferred that a protective coating is applied to the support tube and the sensor link.

Mechanical amplifiers have also seen use in conjunction with VRMT sensors, with one such amplifier configuration being described in prior art U.S. Pat. No. 6,880,408, which is incorporated herein by reference in its entirety. Such an amplifier is described to generally amplify a given load by multiplying the displacement by the stiffness of the load carrying member in order to obtain a reliable displacement measurement. The precision of the measurement as a percentage of full scale load is determined by the ratio of the smallest displacement that the device can resolve to the displacement under full load. In this patent, an embodiment of mechanical amplifiers is described as comprising first and second amplifier mounting pads, at least one of the first and second amplifier mounting pads connecting to a load carrying member, the first and second sensor mounting pads connected to the first and second amplifier mounting pads via flexible connecting members; and a sensor connected to the first and second sensor mounting pads.

Regarding conventional designs of porch-mounted systems, compression load cells have been employed in such systems and as configured they have the sensitivity needed to work in the limited space available between the tendon porch and the tendon top connector assembly. One major drawback with the compression load cells that are often configured in porch-mounted systems is that after only a few years of service they begin providing unreliable measurement signals. This is not advantageous for a floating platform that may have a service life of 20-50 years as it means the compression load cells need to be serviced often over the lifespan of the platform. In addition to this drawback, the compression load cells and their embedded sensors cannot be serviced or replaced without completely removing tension from the associated tendon line. This results in increased service costs and potential downtime for a given platform which incurs additional costs.

One other drawback regarding porch-mounted compression load cell tendon tension monitoring systems results from the arrangement of discrete compression load cells about the central axis of a tendon line along the central axis of a tendon top connector assembly. This results in a discontinuous load path from the upper load plate to the lower load plate. This requires the load plates to be stiff enough to resist significant deflection between the load cell contact points, and also wide enough to transmit the tendon force among the discrete compression load cells. Both of these factors result in heavy and expensive plate sections, which incur significant initial costs and again require additional expenditure to service.

A porch-mounted tendon tension monitoring system is thus desired that has reduced service requirements over time and simpler serviceability when needed. It would also be desirable to optimize and utilize variable reluctance measurement technology sensors in a porch-mounted tendon tension monitoring system.

SUMMARY OF THE INVENTION

The invention involves a porch-mounted tendon tension monitoring system for tension leg platforms that utilizes variable reluctance measurement technology sensors instead of conventional bridge "load cell" style sensors. As a result, this tendon tension monitoring system beneficially has fewer anticipated service intervals over its lifetime while also being serviceable without the need to completely remove tension to a given leg of a tension leg platform. The tendon tension monitoring system described herein includes an optimized configuration of variable reluctance measurement technology sensors, wherein the sensors have increased wire turns around each end of their C-cores or alternatively are mounted on mechanical amplifiers or both. An array of optimized variable reluctance measurement technology sensors can be configured as part of a porch-mounted system. The sensors can be located between the tendon top connector flanges and can be configured to measure the gap between the flanges. The system can then calculate and report tendon tension based on the changes in this gap. Because the sensors are not required to support a significant portion of the compressive load in order to function, the supportive load can be provided by a centralized compressive cylinder, resulting in a smaller, more efficient structure that does not need to be disassembled should replacement of the sensors be required.

BRIEF DESCRIPTION OF THE DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 12 is a graphical representation showing inductance as a function of number of windings for several embodiments of a porch-mount optimized variable reluctance measurement technology ("VRMT") sensor, as could be configured in an embodiment of a porch-mount variable reluctance measurement technology tendon tension monitoring system.

DETAILED DESCRIPTION

Figure 1:
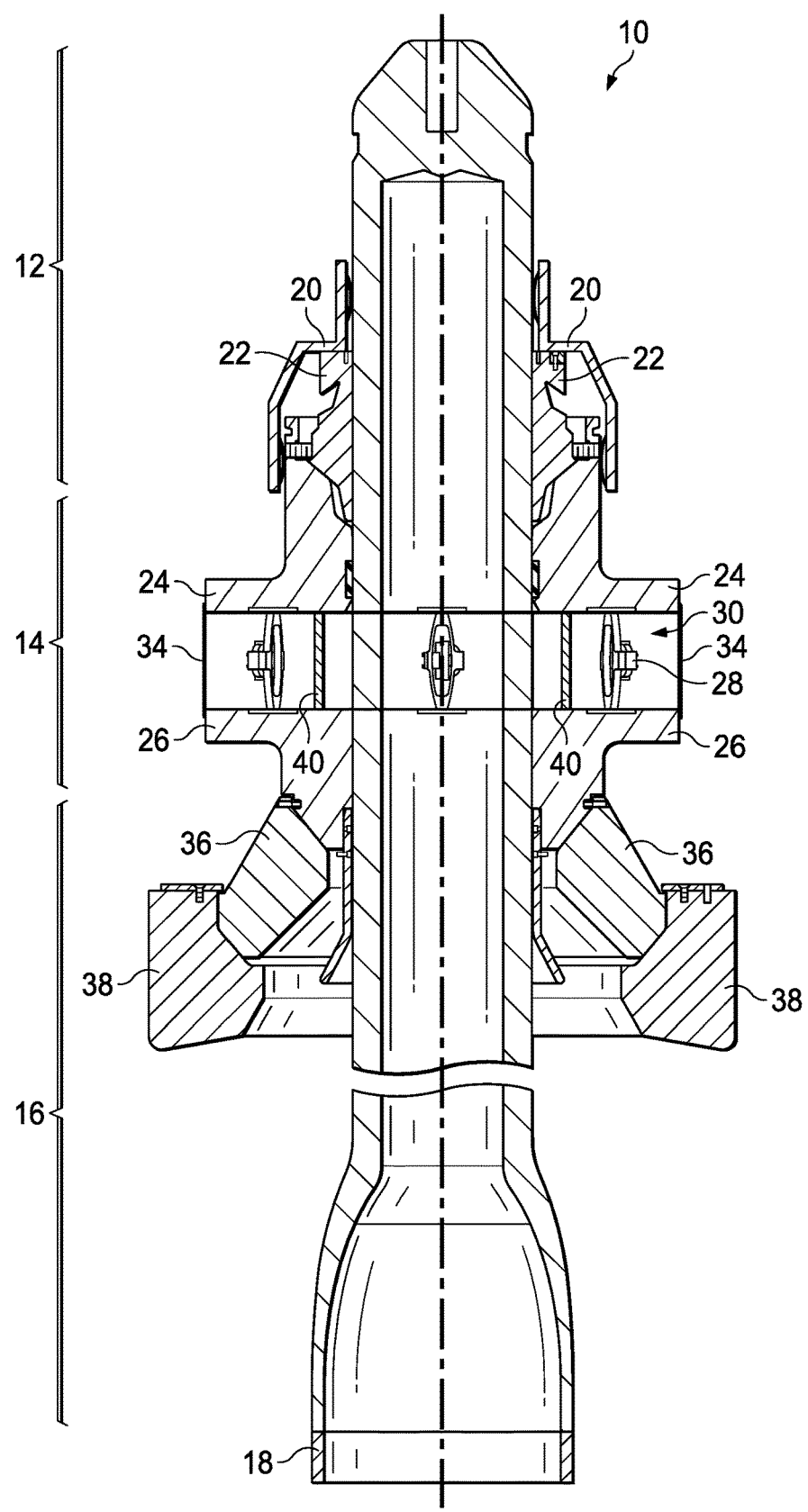
FIG. 1 is a side cross sectional view of an embodiment of a porch-mounted variable reluctance measurement technology tendon tension monitoring system.

Exemplary embodiments are illustrated in referenced figures of the drawings. It is intended that the embodiments and figures disclosed herein are to be considered illustrative rather than restrictive. No limitation on the scope of the technology that follows is to be imputed to the examples shown in the drawings and discussed herein.

A porch-mounted tendon tension monitoring system ("TTMS") using optimized variable reluctance measurement technology ("VRMT") sensors instead of conventional "load cell" style sensors is described herein. Such a system is typically installed in conjunction with a vertical mooring system for a floating platform. These systems are often used for platforms in 1000-6000 ft. of water offshore, though they can also be used at other depths outside this range. In general, tendon tension monitoring systems help to confirm that the tension of the moorings is sufficient to assure that the natural frequency of the platform system is sufficiently higher than the wave frequencies and other naturally occurring conditions that may affect platform stability. Differing from prior porch-mounted tendon tension monitoring systems where discrete compression "load cells" were configured, in an embodiment, the new design is configured with a single cylindrical compression unit that is axis-symmetric to the line of force with the top connector assembly ("TCA"). The benefits resulting from such a configuration include the following: (1) the transmission force between the upper and lower load plates of the TCA is continuous about the circumference of the contact surface between the plates and the compression unit, and the compression unit and sensors are more compact in terms of radial spacing than the typical porch-mounted tendon tension monitoring system compression load cells; this results in the size, weight, and cost of the TCA load plate being significantly reduced and also makes the plate easier to handle onsite; (2) the sensors are decoupled from the compression unit and can be replaced without removing tendon tension; this results in much simpler serviceability of the TTMS; and (3) The sensors are based on variable reluctance measurement technology sensors, thereby providing both improved accuracy and a significantly longer anticipated service life when compared to conventional "load cell" style tendon tension monitoring system sensors.

A re-design of prior variable reluctance measurement technology sensors to allow them to replace the conventional "load cell" style sensors of prior systems was also necessary. In an embodiment, a porch mount optimized VRMT sensor can be configured with increased wire turns at each end of the C-core. In an embodiment, a porch mount optimized VRMT sensor can be configured with mechanical amplifiers. In another embodiment, a porch mount optimized VRMT sensor can be configured with both increased wire turns at each end of the C-core and with mechanical amplifiers.

In an embodiment, a porch-mounted tendon tension monitoring system can consist of an array of porch-mount optimized VRMT sensors. Such an array can be configured to be mounted between the tendon top connector flanges in the space that would have been occupied by compression "load cell" style sensors in prior designs. The porch-mount optimized VRMT sensors operate by measuring the gap between the flanges. The system can then use this measurement to calculate and report tendon tension based on the changes in the gap. The gap will reduce as load is increased, opposite of how a prior design in-line system would be configured.

By contrast, in a conventional "load cell" style sensor system, the tendon load is transferred between the flanges through the load cells themselves. In an embodiment of a porch-mounted variable reluctance measurement technology tendon tension monitoring system ("PM-VRMT-TTMS"), the load is carried through a single cylindrical compression unit, mounted between two flanges. For either VRMT sensor mounting location described, the VRMT sensors are placed such that they are outside of the load path. This increases the reliability of the system and enables maintenance of the VRMT sensors while the tendon tension is maintained and the system is still in the operational state.

Figure 2:
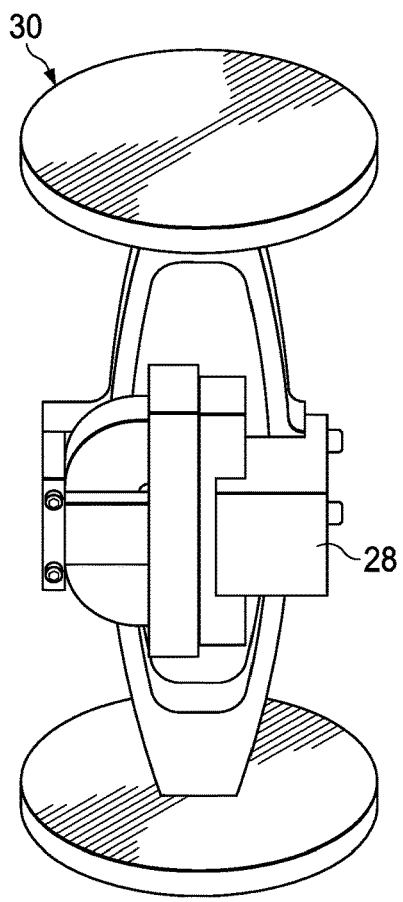
FIG. 2 is a perspective view of a porch-mount optimized variable reluctance measurement technology sensor configured in a mechanical strain amplifier.
Figure 3:
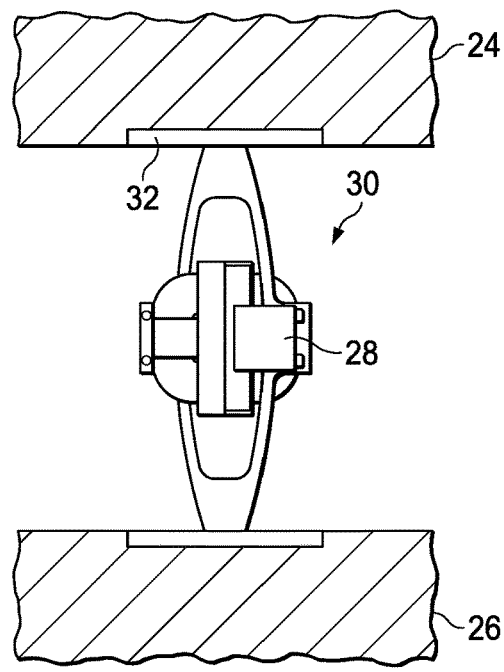
FIG. 3 is an enlarged side cross sectional view of one side of a porch-mounted variable reluctance measurement technology sensor of the variable reluctance measurement technology tendon tension monitoring system as shown in FIG. 1.
Figure 4:
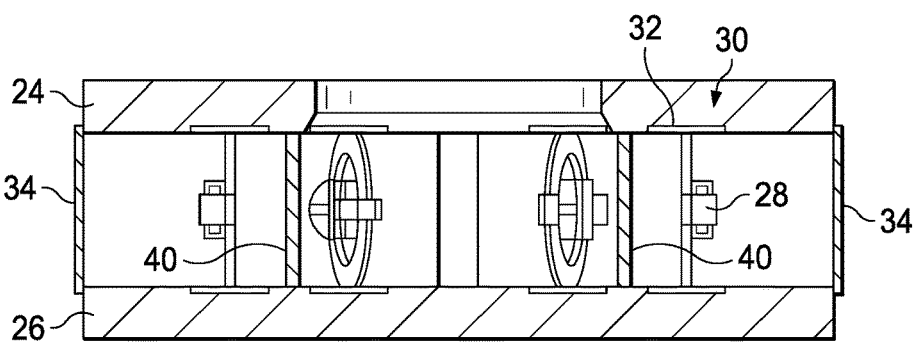
FIG. 4 is an enlarged side cross sectional view of one side of the tendon tension monitoring section of the variable reluctance measurement technology tendon tension monitoring system as shown in FIG. 1.
Figure 6:
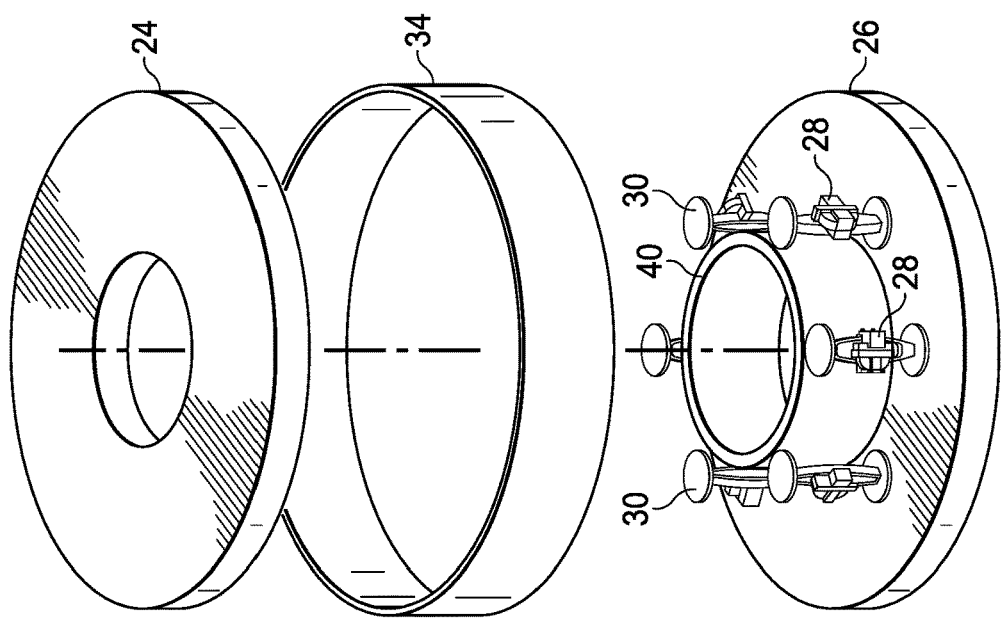
FIG. 6 is a side perspective exploded view of the tendon tension monitoring section of the variable reluctance measurement technology tendon tension monitoring system shown in FIG. 1.
Figure 5:
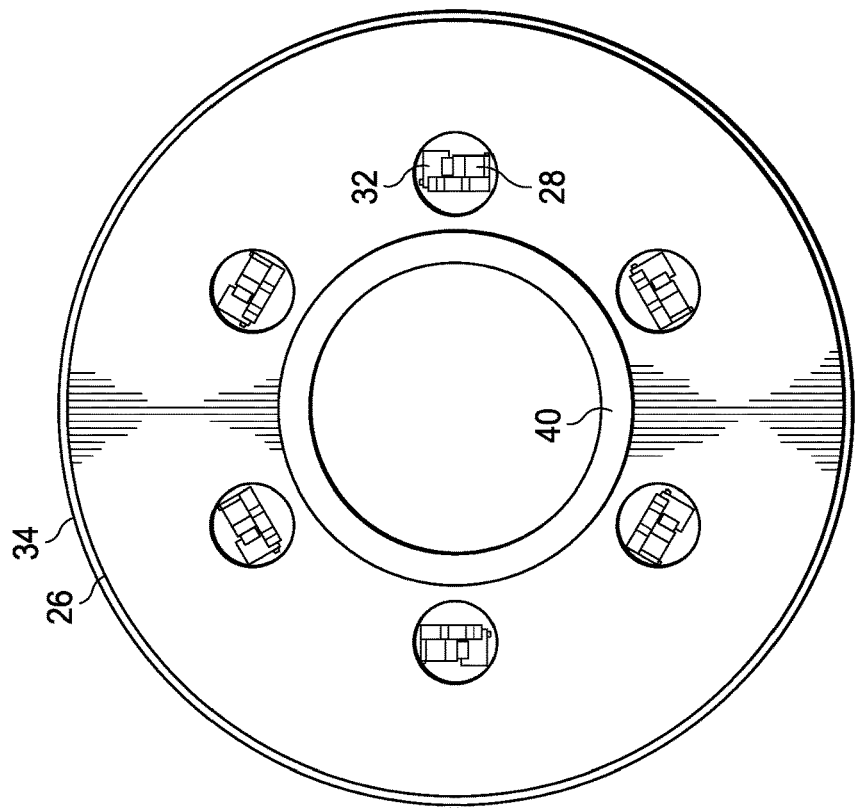
FIG. 5 is an is an enlarged top view of the tendon tension monitoring section of the variable reluctance measurement technology tendon tension monitoring system as shown in FIG. 1 with the upper load plate removed.

Referring to FIGS. 1-6, an embodiment of a porch mount variable reluctance measurement technology tendon tension monitoring system ("PM-VRMT-TTMS") 10 is shown. This system and/or assembly includes several benefits over prior designs as have been described in the accompanying paragraphs. Referring to FIG. 1, the PM-VRMT-TTMS 10 includes each of the following sections: a top connector assembly 12, a tendon tension monitoring section 14, and a lower connector assembly 16. The top connector assembly 12 can include a slip/bowl assembly 20, clamps 22, and may also include other components. The top connector assembly helps secure the PM-VRMT-TTMS 10 to the tendon tension pipe 18, which houses the tendon. In an embodiment, the tendon tension monitoring section 14 can include an upper load plate 24, a lower load plate 26, a rubber boot 34, a plurality of porch-mount optimized VRMT sensors 28 each mounted in a mechanical strain amplifier 30, and a single cylindrical compression cell 40. In an alternative embodiment, multiple cylindrical compression cells can be configured about a central compression cell, or if there is no central compression cell, an inner elastomeric boot can be installed to resist ingress of sea water from the inner bore of the load plates. In the embodiment shown in FIGS. 1-6, six VRMT sensors 28 are shown, each mounted in a mechanical strain amplifier 30, between the upper load plate 24 and the lower load plate 26. In an embodiment more or fewer sensors may be configured, and the spacing/location of each sensor can also differ from what is shown. FIG. 2 shows one of the porch-mount optimized VRMT sensors 28 mounted in a mechanical amplifier strain gauge 30. FIG. 3 illustrates an enlarged side view of one of the sensors 28 mounted in a mechanical amplifier strain gauge 30. In this view, the mechanical amplifier strain gauge mounting slots 32 are more prominently shown. These slots 32 can be configured in an embodiment to aid in the serviceability of the PM-VRMT-TTMS 10. FIG. 4 illustrates a side view of the plurality of porch-mount optimized VRMT sensors 28 mounted in strain amplifiers 30, and configured between the upper load plate 24 and lower load plate 26. FIG. 5 similarly illustrates a top view of the configuration of FIG. 4. FIG. 6, then shows an exploded perspective view of this same portion of the tendon tension monitoring section 14 of FIGS. 1, 4, and 5. In this view the upper load plate 24 is shown spaced apart from the lower load plate 26. The porch-mount optimized VRMT sensors 28 are shown on lower load plate 26. Also shown spaced apart from the lower load plate 26 is the outer rubber cylindrical boot 34. This boot is put in place to protect the sensor 28 and may be made from a variety of materials with rubber being the most typical. The void area that surrounds the VRMT sensors between the rubber boot and upper and lower load plates will also typically be filled with non-conductive fluid such as a silicone based fluid or gel. Other non-aqueous fluids may also be used. The purpose of the non-conductive fluid or gel is to add additional prevention measures against corrosive deterioration by sea water of the load cell materials, sensors, conductive apparatus and fixtures.

In an embodiment of the tendon tension monitoring section 14 of FIGS. 1, 4, and 5, each slot 32 that holds the strain amplifier 30 and VRMT sensors 28, can also be extended towards the outer ends of the load plates such that when servicing a given sensor they can be more easily slide in and out of their functional position. This feature when configured can allow the strain amplifier 30 and VRMT sensors 28 to more easily be serviced and replaced.

Figure 7:
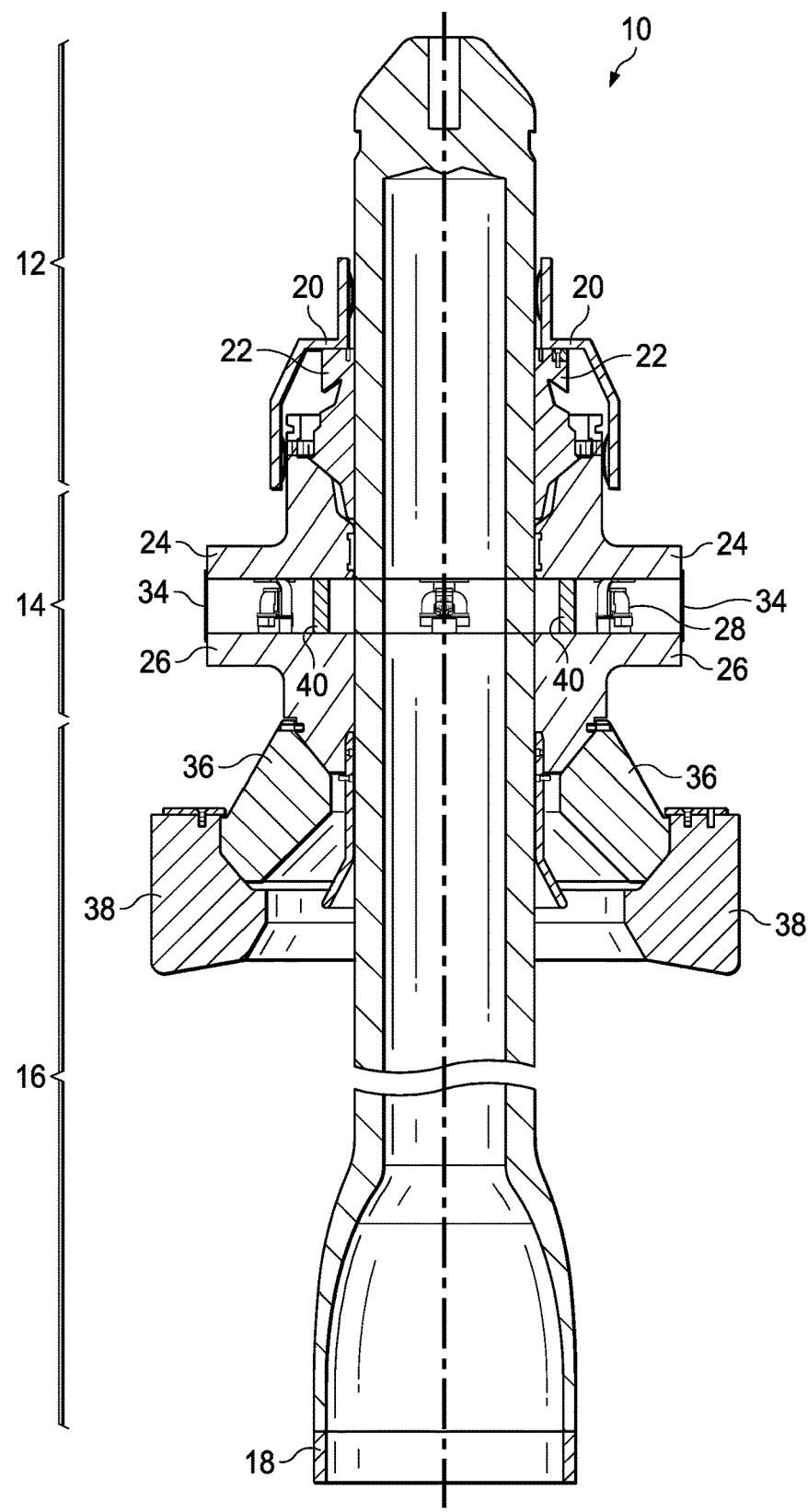
FIG. 7 is a side cross sectional view of an alternate embodiment of a porch-mounted variable reluctance measurement technology tendon tension monitoring system.

Referring to FIG. 7, an alternative embodiment of a porch mount variable reluctance measurement technology tendon tension monitoring system ("PM-VRMT-TTMS") 10 is shown. For the most part, this embodiment resembles and has the same structural features as the embodiment described in relation to FIGS. 1-6, the difference here being the removal of the mechanical strain amplifier from the system. For the embodiment illustrated by FIG. 7, the porch-mount optimized VRMT sensors 28 are mounted to an upper load plate 24 and a lower load plate 26 without the need to configure a mechanical strain amplifier. As described above and below in reference to FIG. 11, in this embodiment, the porch-mount optimized VRMT sensors 28 can be used for this arrangement.

Referring again to FIG. 7, a lower connector assembly 16 is illustrated and positioned beneath the tendon tension monitoring section 14. This assembly can include a flex element 36, a lower connector element 38, and may also include other components. The lower connector assembly 16 assists in securing the tendon tension monitoring section 14 to the tendon pipe 18.

Figure 8:
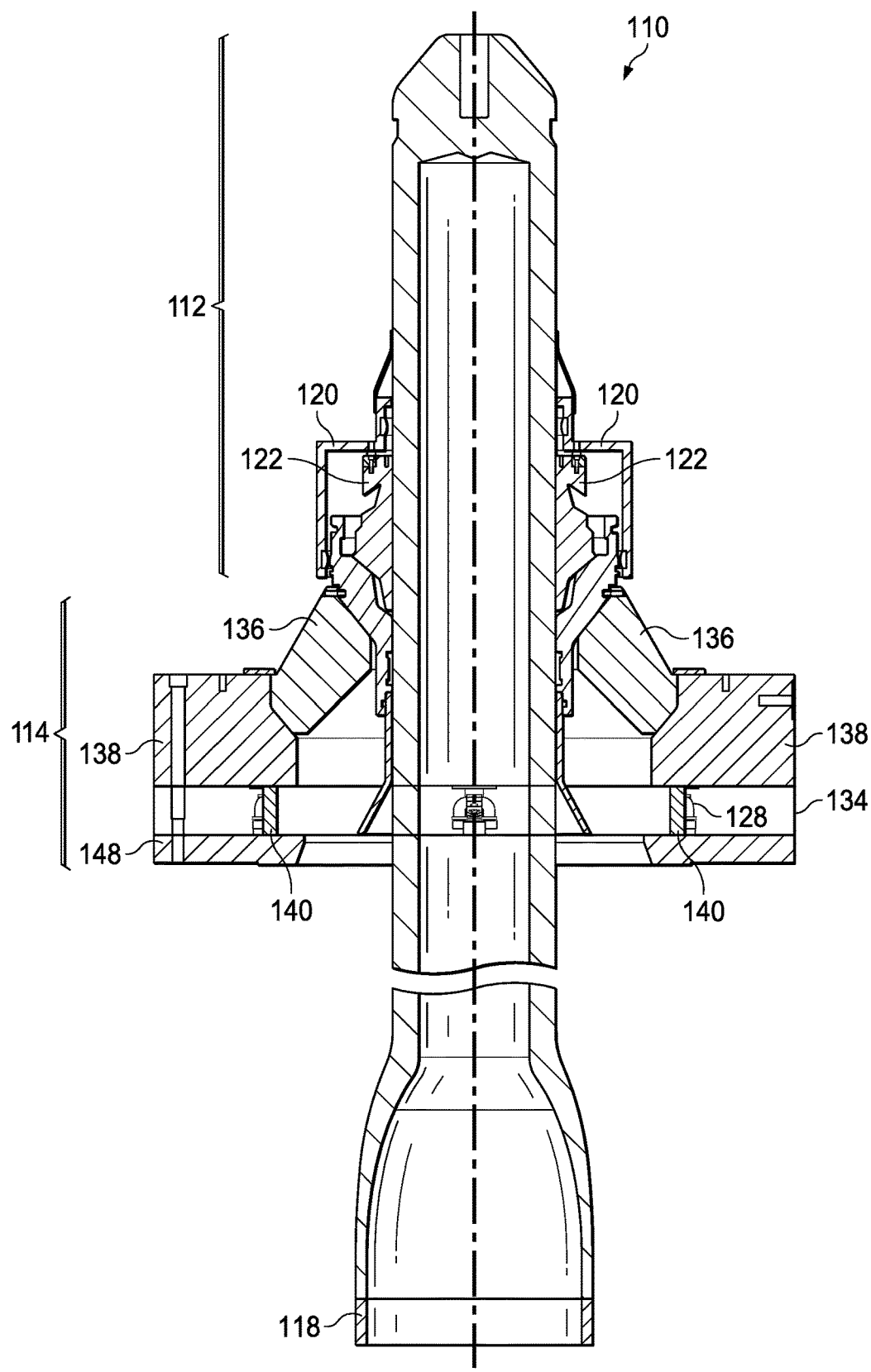
FIG. 8 is a side cross sectional view of an alternate embodiment of a porch-mounted variable reluctance measurement technology tendon tension monitoring system wherein the tendon tension monitoring system is configured below the flex element.
Figure 9:
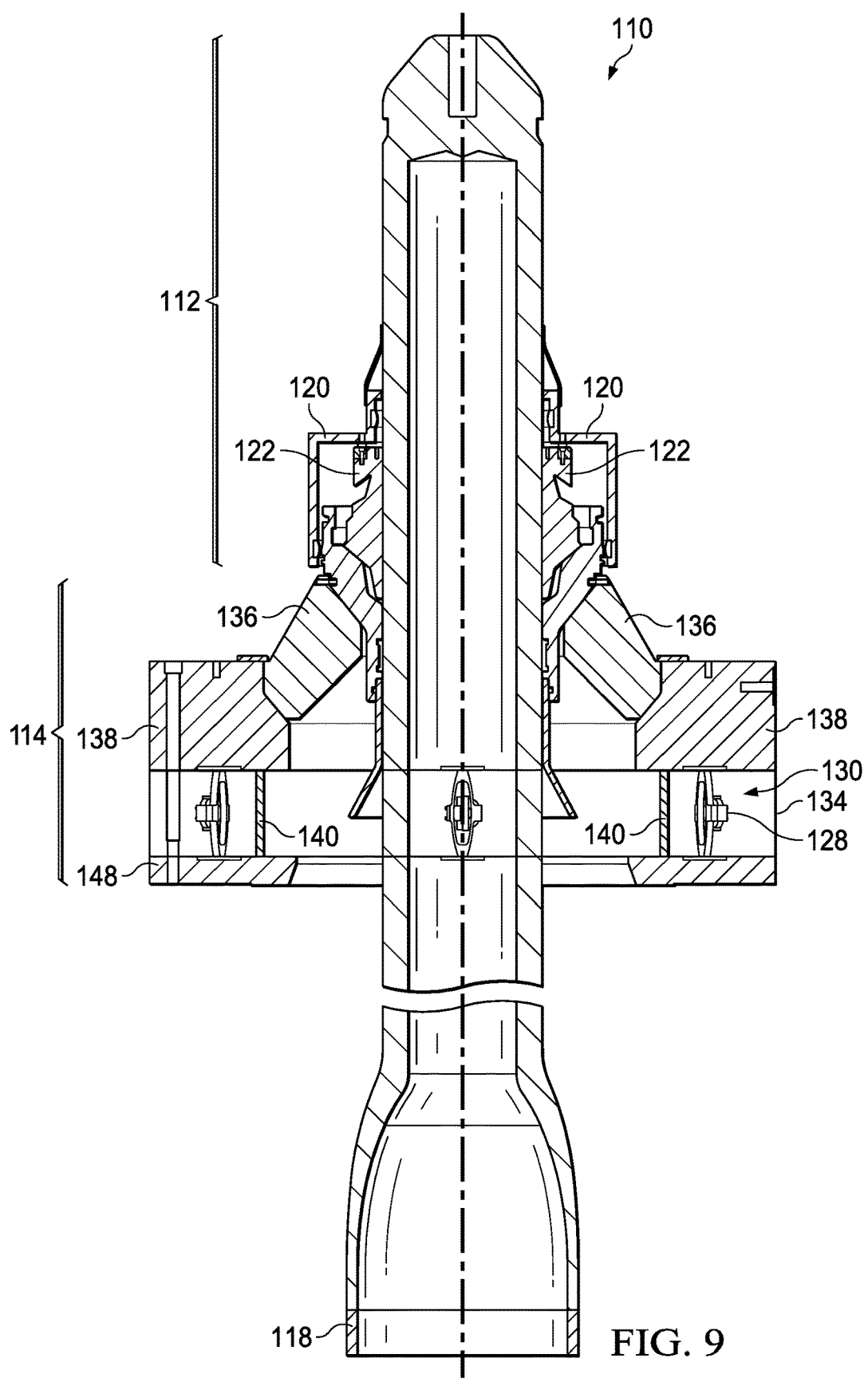
FIG. 9 is a side cross sectional view of an alternate embodiment of a porch-mounted variable reluctance measurement technology tendon tension monitoring system wherein the tendon tension monitoring system is configured below the flex element and the variable reluctance measurement technology sensors are each mounted in a mechanical strain amplifier.

Referring to FIG. 8 and FIG. 9, an alternate embodiment of a porch-mounted variable reluctance measurement technology tendon tension monitoring system 110 is shown wherein the tendon tension monitoring system is configured below the flex element 136. FIG. 8 illustrates an embodiment wherein the VRMT sensors 128 are configured without mechanical strain amplifiers and FIG. 9 illustrates an embodiment wherein VRMT sensors 128 are each configured with a mechanical strain amplifier 130.

Again referring to both FIG. 8 and FIG. 9, in the embodiment shown, the top connector assembly 112 can include a slip/bowl assembly 120, clamps 122, and may also include other components. Six VRMT sensors 128 are shown configured beneath flex element 136 and between a sub-flex-element upper load plate 138 and a sub-flex-element lower load plate 148. In an embodiment more or fewer sensors may be configured, and the spacing/location of each sensor can also differ from what is shown. In an embodiment, slots (not shown) can be configured to aid in the serviceability of the VRMT sensors 128. In an embodiment, an outer rubber cylindrical boot 134 can also be configured. This boot is put in place to protect the sensor 128 and may be made from a variety of materials with rubber being the most typical. The void area that surrounds the VRMT sensors between the rubber boot and upper and lower load plates will also typically be filled with non-conductive fluid such as a silicon based fluid. Other fluids may also be used. On the interior side of the VRMT sensors 128, a single cylindrical compression cell 140 is shown, though multiple cylindrical compression cells can be configured. Similar to other embodiments, the system 110 connects to a tendon pipe 118 on its lower end.

In the various described embodiments of the variable reluctance measurement technology tendon tension monitoring system, varying placement of the VRMT sensors configured in each embodiment will have an effect on the bending moment of the system and thus different correction factors can be applied to the measurements of the VRMT sensors to address this difference.

Regarding the electronic wiring of the porch mount variable reluctance measurement technology tendon tension monitoring system, a cable must be run to each porch-mount optimized VRMT sensor such that readings can be collected and processed by a computing system and then relayed to operations personnel. In an embodiment, cabling from the sensors will typically be run from the sensors and out of tendon tension monitoring section 14 through rubber grommets (or packing glands) such that the fluidic material in the cavity between the load plates will not escape. The cabling can then extend to a relay point or all the way to the surface. This description of one possible embodiment of the cabling configuration is not meant to be limited and a variety of cabling configurations could be employed. For example, the sensors could also transmit their measurement data wirelessly and they can either be powered by hard power lines or by a battery system. In a typical configuration, the VRMT sensors and signal conditioning equipment are powered by hard wired power lines and relay data over wired connections. Alternatively, the sensors could be connected to a battery-powered signal conditioning/data acquisition unit equipped with data storage modules that can be retrieved by a diver or remote-operated vehicle (ROV). There are multiple different wiring path configurations that can be utilized as would be understood by a person of ordinary skill in the art.

As mentioned above, a computing system can be used to collect, log, process, analyze, broadcast, and display readings from the porch-mount optimized VRMT sensors of the system described herein. The system can also be used to determine when sensors may be malfunctioning and providing inaccurate readings. One method for determining if a sensor is providing inaccurate readings is to compare it to the other sensors in the same pack or group of sensors deployed around a tendon. If a sensor is reporting values that differ from the other sensors in its pack or grouping, then this may be an indication that the sensor needs replacement.

Figure 10:
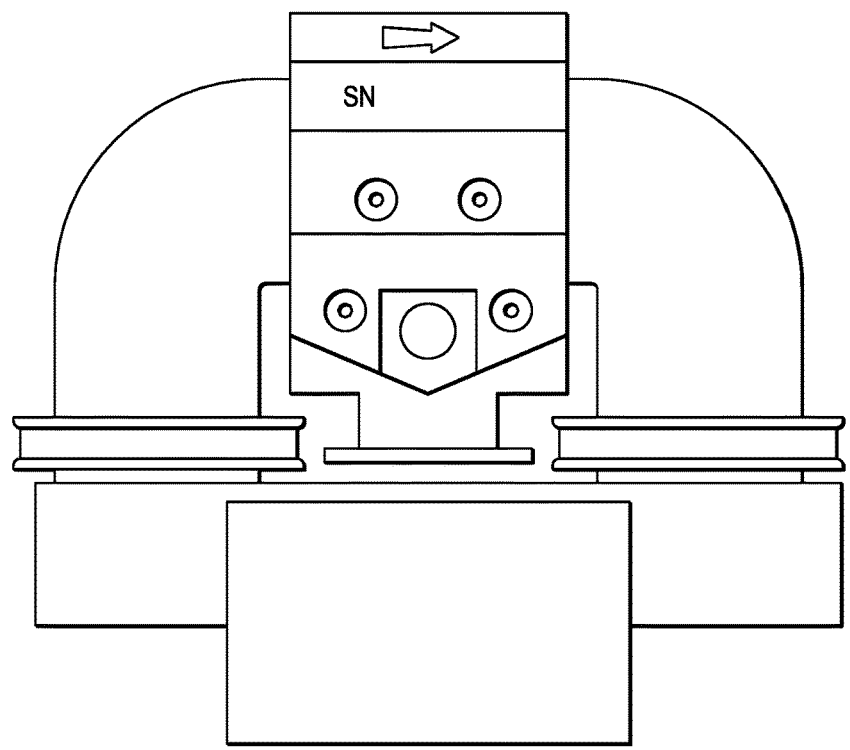
FIG. 10 is a side view of a prior art variable reluctance measurement technology ("VRMT") sensor.

Referring to FIG. 10, a prior art variable reluctance measurement technology ("VRMT") sensor is shown. This VRMT sensor design has the typical coil position as was previously used on in-line style VRMT tendon tension monitoring systems. As mentioned previously, due to the space constraints of the prior design of porch style "load cell" style sensors, this VRMT sensor design would not be useable on the conventional porch configuration.

Figure 11:
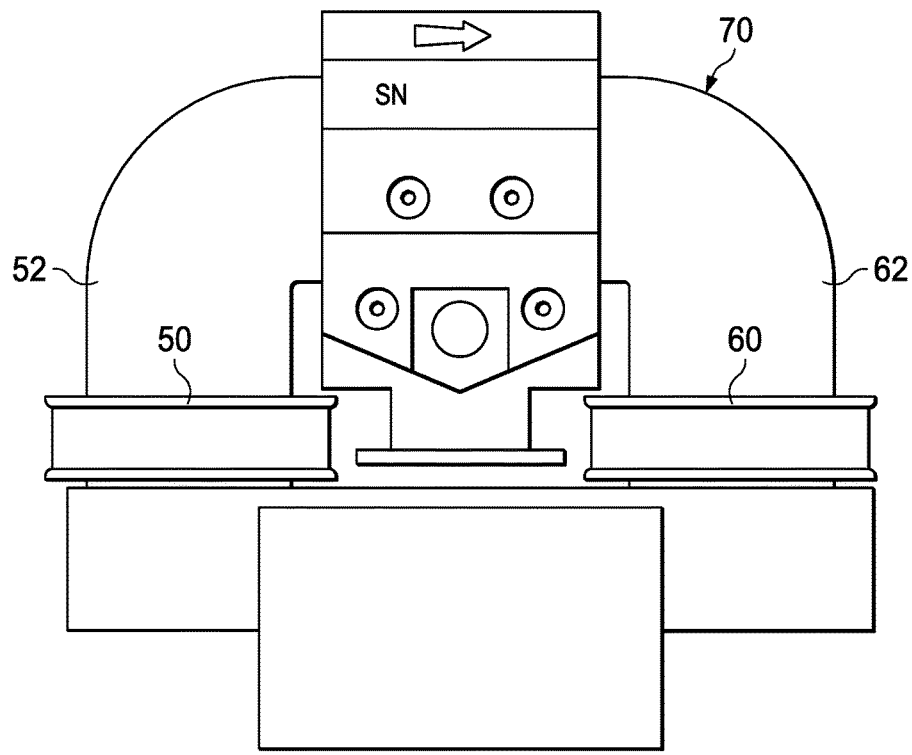
FIG. 11 is a side view of a porch-mount optimized variable reluctance measurement technology ("VRMT") sensor, as could be configured in an embodiment of a porch-mounted variable reluctance measurement technology tendon tension monitoring system.

Referring to FIG. 11, a porch-mount optimized VRMT sensor design is shown. This sensor can be configured in an embodiment of a porch-mounted variable reluctance measurement technology tendon tension monitoring system as described herein. As can be seen in this design, the coil positions have been altered, wherein each of a first coil 50 and a second coil 60 are moved higher up on a first left 52 and a second leg 62 of each end of the C-core 70. The VRMT sensor I-core 80 is also shown. The I-core of the VRMT sensor, together with the C-core, serve as a pair of magnetically permeable core elements. Each are mounted to separate load plates such that varying distance between the load plates causes the gap between the I-core and the C-core to change. An AC voltage energizing the windings around the ends of the C-core provide an electrical inductance which varies as function of the gap, and thus, also, the displacement between the load plates. The rigidity of the cylindrical compression cell or cells can be tuned and/or configured based on the anticipated or designed tensile load point for the tendon of a TLP. Another optimization from the prior art VRMT sensor described above is that the number of coil windings in the first coil 50 and the second coil 60 have both been increased. By increasing the number of windings in each coil the inductance values are increased and greater measurement sensitivity can be obtained. For example, the prior art coils were configured with 82 turns of 24 AWG wire and in a preferred embodiment the porch-mount optimized VRMT sensor coils can be configured with 164 turns of 24 AWG wire. This example is not intended to be limiting. These optimizations allow the porch-mount optimized VRMT sensor to be configured in various embodiments of the porch mount tendon tension monitoring system as described herein and yield a wider range of displacement measurement for a given VRMT sensor.

Referring to FIG. 12, a graphical representation is shown illustrating inductance as a function of number of windings for various potential configurations of porch-mount optimized variable reluctance measurement technology ("VRMT") sensors, as could be configured in an embodiment of a porch-mount variable reluctance measurement technology tendon tension monitoring system. As discussed in the paragraph above, this graphical representation illustrates that by increasing the number of windings in each coil the inductance values may be increased and greater measurement sensitivity can be obtained. As mentioned, by optimizing the winding count and thus the sensitivity of the VRMT sensors, a wider range of displacement measurement for a given VRMT sensor can be obtained.

Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above embodiment descriptions.

The invention claimed is:

1. A porch-mounted tendon tension monitoring system comprising:
   a connector assembly configured to connect to the top of a tendon; and
   a tendon tension monitoring apparatus secured to the connector assembly and comprising:
   a pair of substantially parallel mounting flanges separated by an axial distance;
   a plurality of variable reluctance measurement technology sensors, each such sensor comprising a C-core and an I-core, and the C-core comprising coil windings;
   said plurality of variable reluctance measurement technology sensors positioned between said pair of substantially parallel mounting flanges, such that neither the C-core nor the I-core is fixedly connected to either of the substantially parallel mounting flanges, and configured to measure changes in the axial distance between said mounting flanges; and
   one or more cylindrical compression cells positioned between and supporting said mounting flanges.

2. The porch-mounted tendon tension monitoring system of claim 1, wherein each of the plurality of variable reluctance measurement technology sensors are mounted in a mechanical strain amplifier between the pair of substantially parallel mounting flanges.

3. The porch-mounted tendon tension monitoring system of claim 2, wherein the pair of substantially parallel mounting flanges comprise indentations, wherein each mechanical strain amplifier engages at least one indentation.

4. The porch-mounted tendon tension monitoring system of claim 1, further comprising a boot, the boot circumscribing the plurality of variable reluctance measurement technology sensors and configured to inhibit the ingress of sea water into the axial space between the substantially parallel mounting flanges.

5. The porch-mounted tendon tension monitoring system of claim 4, wherein the boot comprises rubber.

6. The porch-mounted tendon tension monitoring system of claim 4, wherein the volume encompassed by the pair of substantially parallel mounting flanges, the boot, and the one or more cylindrical compression cells is filled with a non-conductive fluid.

7. The porch-mounted tendon tension monitoring system of claim 6, wherein the non-conductive fluid is a silicone-based fluid or gel.

8. The porch-mounted tendon tension monitoring system of claim 6, wherein the non-conductive fluid is a non-aqueous fluid.

9. The porch-mounted tendon tension monitoring system of claim 4, wherein the boot engages an outer circumference of the pair of substantially parallel mounting flanges.

10. The porch-mounted tendon tension monitoring system of claim 1, wherein the one or more cylindrical compression cells comprises a plurality of compression cells.

11. The porch-mounted tendon tension monitoring system of claim 1, wherein the plurality of variable reluctance measurement technology sensors are radially equidistant from a longitudinal central axis of the tendon.

12. The porch-mounted tendon tension monitoring system of claim 1, wherein the plurality of variable reluctance measurement technology sensors are equiangularly displaced around the pair of substantially parallel mounting flanges.

13. The porch-mounted tendon tension monitoring system of claim 1, wherein said variable reluctance measurement technology sensors are configured to collect data reflecting changes in the axial distance between said pair of substantially parallel mounting flanges, and said apparatus further comprising a computing system configured to receive and process said data.

14. The porch-mounted tendon tension monitoring system of claim 13, wherein the computing system is communicatively coupled to the plurality of variable reluctance measurement technology sensors.

15. The porch-mounted tendon tension monitoring system of claim 13, wherein the computing system is communicatively coupled to the plurality of variable reluctance measurement technology sensors through cabling.

16. The porch-mounted tendon tension monitoring system of claim 1, wherein the coil windings of the C-core comprise at least 164 turns of wire.

* * * * *